US008208936B2

(12) United States Patent
Lindoff et al.

(10) Patent No.: US 8,208,936 B2
(45) Date of Patent: Jun. 26, 2012

(54) METHODS AND APPARATUS FOR IMPROVING CELL-EDGE DATA THROUGHPUT IN A WIRELESS COMMUNICATIONS SYSTEM

(75) Inventors: Bengt Lindoff, Bjärred (SE); Andres Reial, Malmö (SE); Anders Rosenqvist, Södra Sandby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 743 days.

(21) Appl. No.: 12/204,040

(22) Filed: Sep. 4, 2008

(65) Prior Publication Data

US 2010/0056170 A1    Mar. 4, 2010

(51) Int. Cl.
H04W 72/00 (2009.01)
H04W 4/00 (2009.01)
H04W 36/00 (2009.01)
H04B 7/212 (2006.01)

(52) U.S. Cl. .......... 455/452.1; 455/435.2; 455/438; 455/450; 455/453; 370/328; 370/337; 370/338

(58) Field of Classification Search ....... 455/450–452.2, 455/453, 436–443; 370/328–338
See application file for complete search history.

(56) References Cited

U.S. PATENT DOCUMENTS

| 6,563,809 | B1* | 5/2003 | Proctor et al. ............... 370/335 |
| 7,162,203 | B1* | 1/2007 | Brunner ....................... 455/63.1 |
| 7,299,011 | B2* | 11/2007 | Penther ...................... 455/67.13 |
| 7,656,969 | B2* | 2/2010 | Strong ........................... 375/316 |
| 7,929,412 | B1* | 4/2011 | Gurbuz et al. ................ 370/208 |
| 2004/0052236 | A1* | 3/2004 | Hwang et al. ................ 370/342 |
| 2004/0125773 | A1 | 7/2004 | Wilson et al. |
| 2004/0224692 | A1* | 11/2004 | Hamabe ........................ 455/442 |
| 2006/0057965 | A1* | 3/2006 | Braun et al. ................. 455/67.11 |
| 2007/0109999 | A1* | 5/2007 | Brunner ........................ 370/331 |
| 2008/0014958 | A1* | 1/2008 | Kim et al. .................. 455/452.2 |
| 2008/0317014 | A1* | 12/2008 | Veselinovic et al. .......... 370/380 |
| 2009/0130985 | A1* | 5/2009 | Lee et al. ................... 455/67.11 |
| 2009/0270101 | A1* | 10/2009 | Seki ........................... 455/435.2 |
| 2010/0022193 | A1* | 1/2010 | Melis et al. ..................... 455/73 |

(Continued)

FOREIGN PATENT DOCUMENTS

EP    1617691 A1    1/2006

(Continued)

OTHER PUBLICATIONS

3RD Generation Partnership Project. "OFDM with Interference Control for Improved HSDPA Coverage." 3GPP TSGf RAN WG1 #37, R1-04-0572, Montreal, Canada, May 10-14, 2004.

(Continued)

Primary Examiner — Marivelisse Santiago Cordero
Assistant Examiner — Mong-Thuy Tran
(74) Attorney, Agent, or Firm — Coats & Bennett, P.L.L.C.

(57) ABSTRACT

Methods and apparatus for adaptively transmitting data in a wireless communication network are disclosed, in which channel conditions between a mobile terminal and two or more base stations in an active set are evaluated and used to select a transmission mode from a set of available downlink transmission modes including a non-interference-coordinated point-to-point transmission mode as well as at least one of a multi-cell single-frequency-network transmission mode and an interference-coordinated point-to-point transmission mode. Using the dynamic transmission mode selection described herein, a higher cell-edge throughput in HSDPA systems may be achieved.

26 Claims, 8 Drawing Sheets

U.S. PATENT DOCUMENTS

2010/0110912 A1\* 5/2010 Wang et al. .................. 370/252
2010/0203886 A1\* 8/2010 Nobukiyo ..................... 455/434

FOREIGN PATENT DOCUMENTS

| WO | 2005/020519 | 3/2005 |
| WO | 2007/025971 | 3/2007 |
| WO | 2008/050958 | 5/2008 |

OTHER PUBLICATIONS

Nihtlia, T. "Performance of Advanced Transmission and Reception Algorithms for High Speed Downlink Packet Access." JyväskyläUniversity Printing House, Jyväskylä2008. ISBN: 978-951-39-3236-7. Available online at: https://jyx.jyu.fi/dspace/bitstream/handle/123456789/18547/9789513932497.pdf?sequence=1.

\* cited by examiner

METHODS AND APPARATUS FOR IMPROVING CELL-EDGE DATA THROUGHPUT IN A WIRELESS COMMUNICATIONS SYSTEM

TECHNICAL FIELD

The present invention generally relates to wireless communication systems, and particularly relates to techniques for improving downlink data transmission rates in cellular packet data systems.

BACKGROUND

The first Wideband Code-Division Multiple Access (W-CDMA) networks, specified in Release 99 of the $3^{rd}$-generation mobile system standards produced by the $3^{rd}$-Generation Partnership Project (3GPP), provided significantly improved data rates compared to predecessor GSM/GPRS systems. Data rates of up to 384 kilobits per second became possible, but the number of users that could be served simultaneously was low, due at least partly to the circuit-switched architecture of the system. Furthermore, these maximum data rates, although much better than previously available, still did not compete favorably with data rates achievable over fixed lines.

In order to improve data services quality, High-Speed Packet Access (HSPA) functionality was added in Releases 5 and 6 of the 3GPP specifications. HSPA, through its downlink component (High-Speed Downlink Packet Access, or HSDPA), can provide packet-switched connections to several simultaneously active users. Release 5 of HSPA, using QPSK and 16-QAM modulation schemes, offered downlink data rates of 1.8-14.4 megabits/second. Later extensions to the standards added specifications for Multiple-Input/Multiple-Output (MIMO) technologies as well as a 64-QAM modulation scheme, allowing peak rates up to 42 megabits/second.

HSDPA downlink data is generally transmitted from a single cell, although it may involve transmission from multiple antennas when MIMO is employed. The original design of HSDPA was driven by a desire to improve the available peak rates for users with good reception conditions, when network loading conditions permit. A mobile terminal is served by a single serving cell, and control signaling is provided over a single radio link. With favorable signaling and loading conditions, interference from neighboring cells is not a major impediment. However, high-rate coverage in more fully loaded systems and in interference-limited scenarios was not prioritized at the time HSDPA was first conceived and designed.

Because the system design for HSDPA was historically focused on maximal data throughput under benign conditions, mobile stations operating under less favorable signal conditions do not benefit as much from the system improvements. For instance, downlink data throughput at cell edges is typically not improved with higher-order modulation schemes or MIMO schemes, since interference from neighboring cells limits the achievable signal-to-interference ratio (SIR) at the mobile station. Advanced receivers, such as those employing Generalized Rake (G-Rake) technology, are capable of suppressing some of the inter-cell interference, but the interference from neighboring cells may not be completely removed since noise enhancement effects limit the interference suppression capabilities of practical receiver structures. In general, link-level improvements from more sophisticated receiver processing alone are insufficient to eliminate the negative effects of inter-cell interference.

Accordingly, there is a need for improved network configurations and resource allocation techniques, to provide higher downlink data rates to mobile terminals situated near cell edges while maintaining high levels of data throughput on a system level.

SUMMARY

Methods and apparatus are disclosed for adaptively transmitting data in a wireless communication network. In various embodiments, channel conditions between a mobile terminal and two or more base stations in an active set are evaluated, and used to select a transmission mode from a set of available downlink transmission modes. This set includes a non-interference-coordinated point-to-point transmission mode as well as at least one of a multi-cell single-frequency-network transmission mode and an interference-coordinated point-to-point transmission mode. Using the dynamic transmission mode selection techniques and apparatus described herein, higher cell-edge throughputs in HSDPA systems may be achieved. Network resources may thus be used with more flexibility and more efficiency at all times, providing the user with the best feasible service for a given geographical location under a variety of network load and channel conditions.

In various embodiments of the invention, a serving cell base station or other network node adapts the transmission mode used to transmit user data packets to mobile terminals located near the serving cell boundary, i.e., at locations where inter-cell interference is significant. Based at least on the mobile terminal's reports of the measured channel qualities for each of two or more cells in the active set, a transmission mode controller selects the optimal transmission mode for the current system conditions.

Accordingly, an exemplary method according to some embodiments of the invention comprises evaluating channel conditions between a mobile terminal and two or more base stations in an active set and selecting, based on the channel conditions, a transmission mode from a set of available downlink transmission modes. The set of available transmission includes a non-interference-coordinated point-to-point transmission mode, in which only the serving cell transmits downlink user data to the mobile terminal, as in conventional HSPA systems, without inter-cell coordination between the serving cell and other cells in the active set. The set of available transmission modes further includes at least one of a multi-cell single-frequency-network transmission mode, in which two or more cells in the active set simultaneously transmit the data to the mobile terminal using the same scrambling code, and an interference-coordinated point-to-point transmission mode, or "round-robin" mode, in which downlink data is transmitted to the mobile terminal only from the serving cell, in scheduled transmission intervals during which neighbor cells in the active refrain from transmitting any downlink HSDPA traffic at all.

In some embodiments of the invention, the evaluation of the channel conditions and the selecting of the transmission mode are performed at the mobile terminal, in which case an indicator of the selected transmission mode is sent by the mobile terminal to the serving base station for use in configuring the transmission mode. In other embodiments, the evaluation of the channel conditions and selection of the transmission mode are performed at a control node on the fixed side of the wireless network, such as at the serving base station or at a radio network controller, based on channel quality data provided by the mobile terminal.

In various embodiments of the invention, the evaluation of the channel quality data comprises estimating a signal-tointerference ratio (SIR) or achievable downlink data rate for each of the available downlink transmission modes, based on the channel quality reports. In these embodiments, selecting a transmission mode may comprise selecting the available transmission mode having the highest estimated downlink data rate or highest achievable downlink data rate. In other embodiments, evaluation of the channel conditions may be performed indirectly, by successively testing two or more of the available downlink transmission modes to determine corresponding achievable data throughputs. In these embodiments, selecting the preferred transmission mode may comprise simply selecting the tested downlink transmission mode yielding the highest achievable data throughput.

In some embodiments, the selection of a transmission mode may be further based on a downlink data throughput requirement for the mobile terminal, current downlink loading information for one or more of the two or more base stations, or both. In still other embodiments, other criteria may be evaluated and used in the selecting a transmission mode; these other criteria might include, for example, channel conditions, achievable data rates, or both, for one or more additional mobile terminals served by base stations in the active set.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
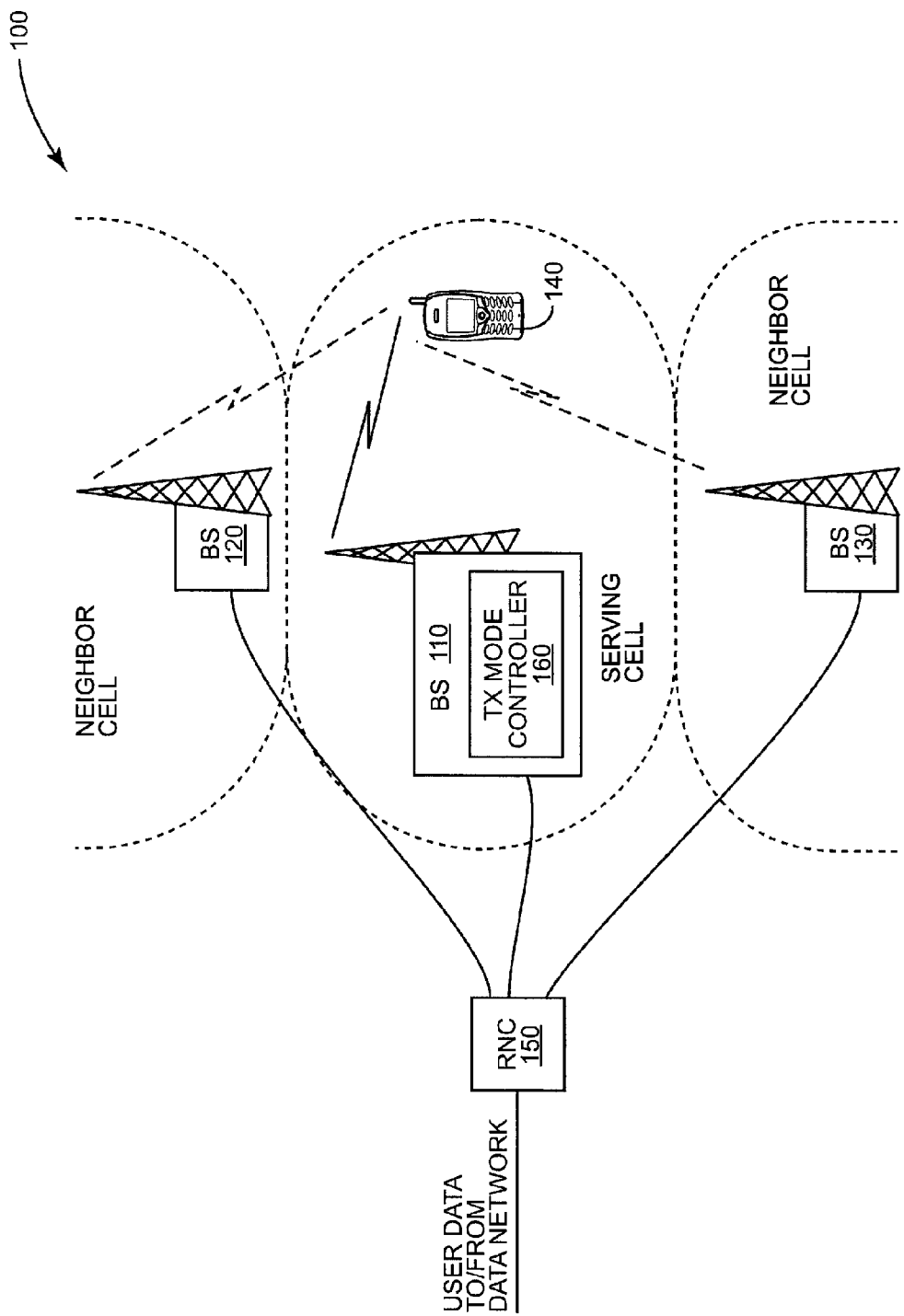
FIG. 1 illustrates a portion of a wireless communication network.

FIG. 1 presents a simplified view of a portion of a Wideband-CDMA/High-Speed Packet Access (W-CDMA/HSPA) system 100, including a base station 110 modified to include a transmission mode controller 160. As will be described more fully below, transmission mode controller 160 is operative in some embodiments of the invention to select a "best" or preferred downlink transmission mode from a set of available modes, based on channel conditions, carrier loading, and the like.

A mobile terminal 140 is in communication with serving base station 110, as well as with neighbor cell base stations 120 and 130. All of the three pictured cells, linked together by radio network controller (RNC) 150, belong to the mobile terminal's active set, and each of the base stations sends transmit power control (TPC) commands to mobile terminal 140 for controlling the mobile terminal's transmitter power. Base station 110 is the serving cell for HSPA service; the serving cell is generally the one that is most "visible" to the mobile station, i.e., the base station able to provide the strongest signal, or the signal with the best signal quality, to the served terminal. Thus, serving base station 110 transmits downlink data packets received from RNC 150 to mobile terminal 140 and receives channel quality reports (channel quality indicators, or CQI) from mobile terminal 140, for use in determining which modulation and coding scheme should be used. The serving cell is responsible for the radio resource control (RRC) to and from the mobile terminal 140, sending signaling information via control channels defined by 3GPP's HSPA specifications.

In several conventional cellular network systems, wireless coverage near cell borders is improved by applying soft-handoff (SHO) techniques. In systems employing SHO, identical information symbols are sent to a mobile terminal from several different cells. The signals received simultaneously by the mobile station over each radio link are coherently demodulated and combined prior to decoding. At the decoder of the mobile station, the effect of SHO is simply an apparent increase in the post-demodulation signal-to-interference ratio (SIR). In conventional W-CDMA systems, each cell in the SHO uses its own scrambling code; these different codes are accounted for during the de-spreading process.

Another approach for providing improved coverage is the use of single-frequency-network (SFN) techniques. This approach is similar to the SHO approach, except that the signals transmitted from each cell are identical, the only difference being in arrival times. In the W-CDMA Multimedia Broadcast Multicast Service (MBMS) SFN configuration, the transmission from all cells uses the same spreading and scrambling codes, so that the received signal structure is generally indistinguishable from a single-cell transmission. The effective channel may simply appear to have a longer delay spread. This approach is typically used for multicast transmission where many users over an extended area are to receive the same content.

The SHO approach is not attractive as a means to extend high-rate coverage in HSDPA, since the presence of several mutually non-orthogonal scrambling codes creates an irreducible interference floor that limits the achievable signal-to-interference ratio (SIR) even in ideal conditions. The SFN approach, i.e. transmitting from several cells using the same scrambling code, is also problematic for use in improved HSDPA systems. If the single common scrambling code is used for simultaneous transmissions in several neighboring cells, an effectively larger cell is created, limiting the number of users that may be handled by the network and complicating network planning. If a common scrambling code for HSDPA is used in parallel with other "regular" codes, then similar interference problems occur as in the SHO scenario.

These problems can be mitigated using the techniques of the present invention. In particular, the serving cell (or other network node) can adapt the transmission mode used for downlink packets targeted to a particular mobile terminal, such as a mobile terminal located close to the cell edge, where inter-cell interference can be significant. Thus, in some embodiments of the present invention, transmission-mode controller 160 can thus select a transmission mode from several available modes, based on the channel conditions between the mobile terminal 140 and each of several different cells in the mobile terminal's active set. As will be described in more detail below, the transmission mode can thus be dynamically adapted to channel conditions and network loading conditions, improving downlink packet service for mobile terminals in less-than-ideal signal environments while allowing overall network performance to be maintained at high levels.

Figure 2:
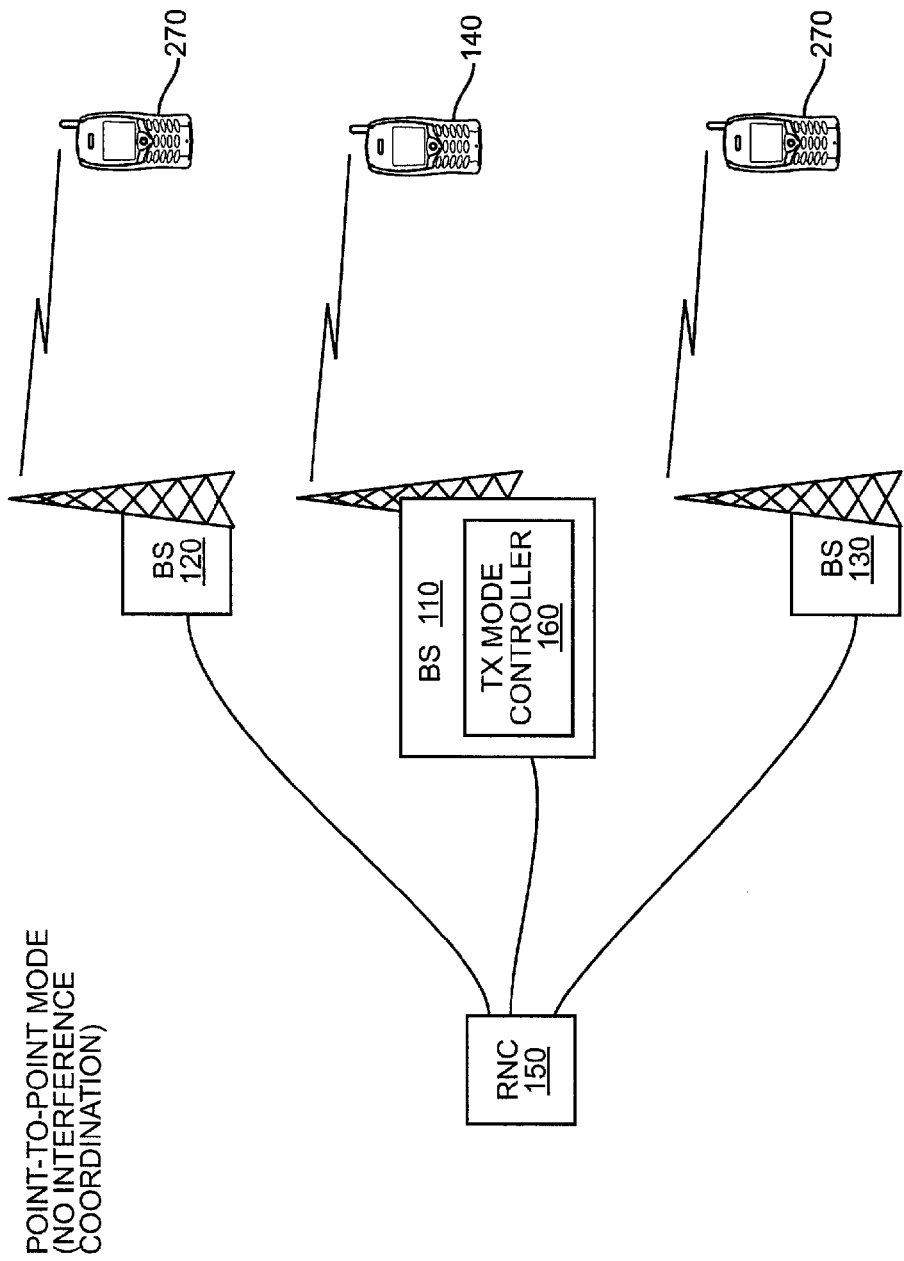
FIG. 2 illustrates a wireless communication network using a point-to-point transmission mode according to some embodiments of the invention.

The set of available transmission modes from which a current mode is dynamically selected includes an "ordinary" transmission mode, i.e., a mode in which the serving cell transmits downlink data to the mobile terminal as in conventional HSPA systems. This mode is effectively a point-to-point transmission mode with no interference coordination between the serving cell and neighboring cells. In other words, neighboring cells are simultaneously active, transmitting HSPA signals to their own served mobile terminals, without any inter-cell coordination. This scenario is illustrated in FIG. 2, where mobile terminal 140 is served by base station 110, but is potentially subject to interference from other base stations in its active set, such as neighbor cell base stations 120 and 130, which are simultaneously serving other mobile terminals 270. If this interference is not too high (e.g., when mobile terminal 140 is not near the edge of its serving cell) than a conventional point-to-point transmission mode is selected by the network transmission-mode controller 160. In this mode, user downlink data destined for mobile terminal 140 is forwarded only to the serving cell base station 110 for HSDPA transmission to the target mobile station.

Figure 3:
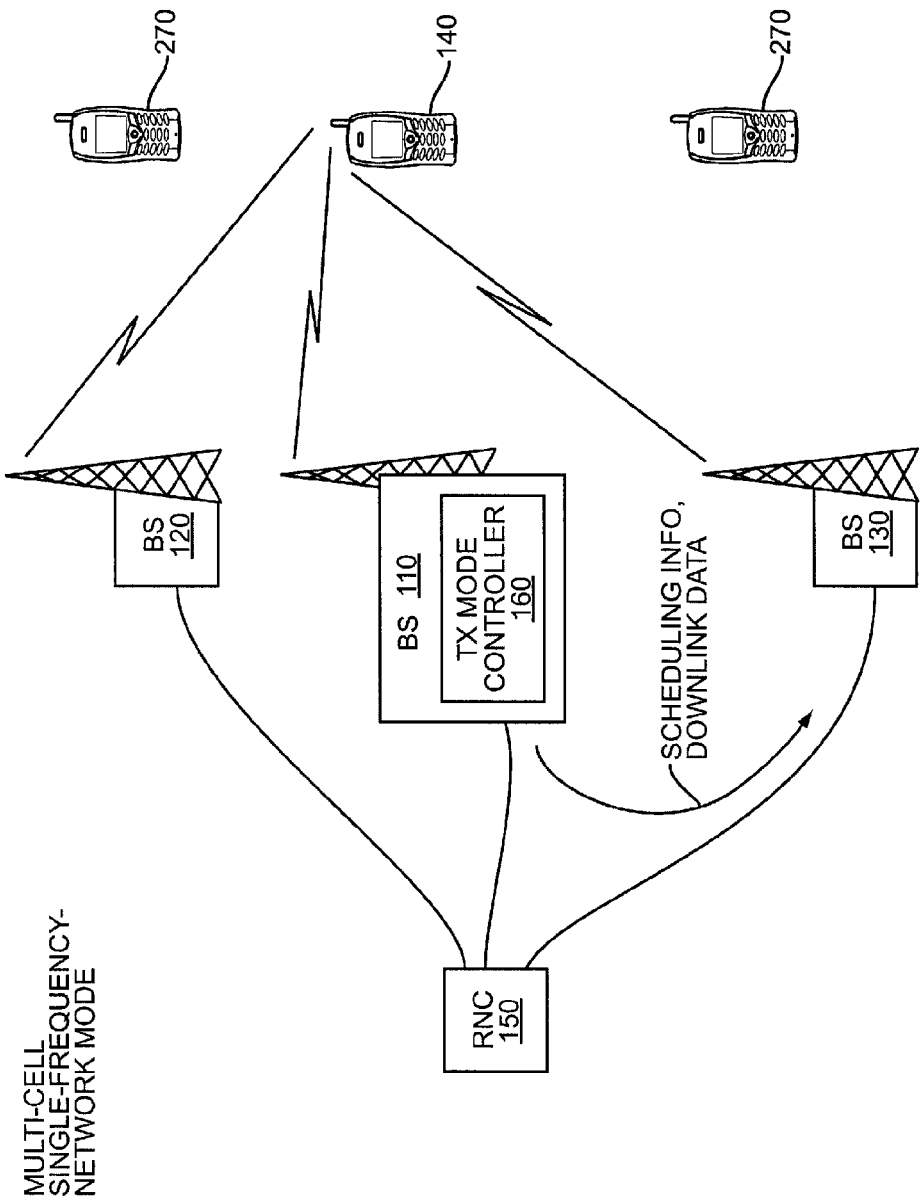
FIG. 3 illustrates a multi-cell single-frequency-network transmission mode.

In some embodiments of the invention, the set of available transmission modes includes a multi-cell single-frequency-network transmission mode, which may be dynamically selected for downlink data transmission to a particular mobile based (at least partly) on the prevailing channel conditions. In this scenario, which might be triggered when the target mobile terminal is close to a cell edge, for example, two or more base stations in the active set transmit the data to the target mobile terminal using the same scrambling code. In other words, an identical High-Speed Physical Downlink Shared Channel (HS-PDSCH) signal is transmitted from each of several base stations using the same scrambling code. This scenario is illustrated in FIG. 3. Here, user downlink data is scheduled by transmission-mode controller 160 for transmission during a particular set of transmission-time intervals (TTIs), and forwarded, along with the scheduling information, to each of two or more cells in the active set. In the pictured scenario, downlink user data, scheduling information (e.g., specifying applicable TTIs), and information identifying a common scrambling code to be used, are forwarded from serving base station 110 to neighbor cell base stations 120 and 130. The downlink user data is then transmitted simultaneously by the three base stations, during the scheduled intervals, with the same scrambling code. Mobile terminal 140 thus coherently receives and decodes the data in a single-frequency-network fashion, achieving a significant power gain compared to the point-to-point mode.

Figure 4:
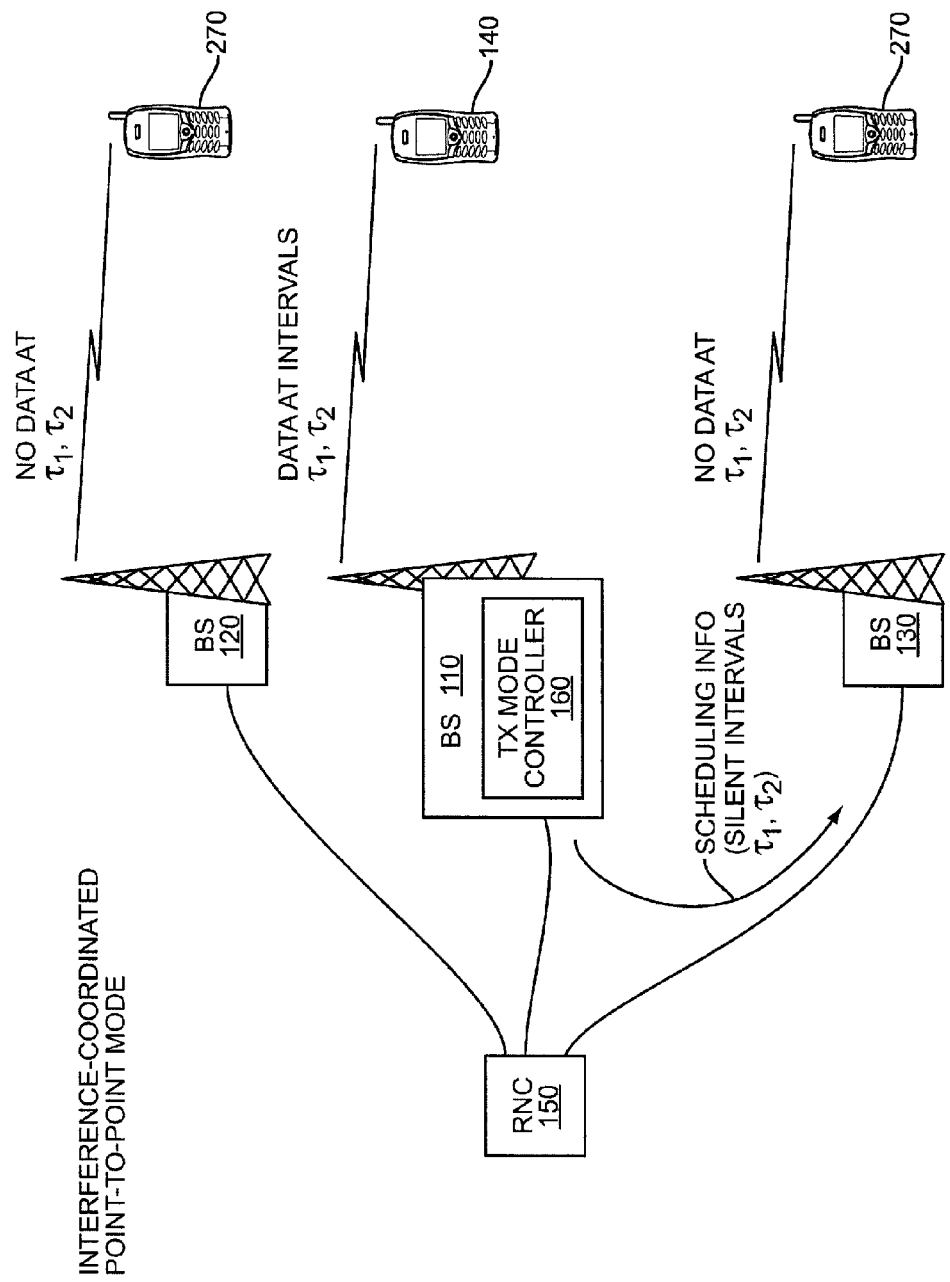
FIG. 4 illustrates an interference-coordinated point-to-point transmission mode, according to some embodiments of the invention.

In some embodiments of the invention, the set of available transmission modes may include an interference-coordinated point-to-point transmission mode, or a "round-robin" mode. In this mode, user downlink data is transmitted only from the serving cell base station during a set of scheduled transmission intervals. However, during these transmission intervals, downlink HSDPA transmissions by one or more neighbor cell base stations are temporarily halted, thus reducing the interference level at the target mobile terminal. This scenario is illustrated in FIG. 4. RNC 150 forwards downlink user data and to the serving cell base station 110 for transmission to target mobile 140. As shown in FIG. 4, user data is thus transmitted to mobile terminal 140 in TTIs $\tau 1$, $\tau 2$, etc., in a point-to-point fashion. However, before serving base station 110 begins transmission of the downlink data, transmission-mode controller 160 first forwards silence-scheduling information to neighbor base stations 120, and 130, the silence-scheduling information indicating intervals during which no downlink user data should be scheduled by the other base stations. Accordingly, neighbor base stations 120 and 130 continue to provide their respective served mobile terminals 270 with HSDPA service, but are silent during the prescribed silent intervals. Because of this inter-cell interference coordination, mobile terminal 140 thus receives the targeted transmission with a higher SIR than it otherwise would.

In the preceding discussion it was assumed that the selection of an appropriate transmission mode for a particular mode was made by the serving base station 110, in particular by the transmission-mode controller 160 illustrated in FIGS. 1-4. With this approach, once the transmission-mode selection is made, scheduling information and user downlink data is forwarded, as necessary, to neighbor cells. Although the simplified block diagrams illustrates downlink data and scheduling information flowing through RNC 150, those skilled in the art will appreciate that some advanced wireless networks include direct interfaces between peer base stations, so that forwarded scheduling information and/or downlink user data may in some cases pass directly from a serving cell to a neighbor.

Figure 5:
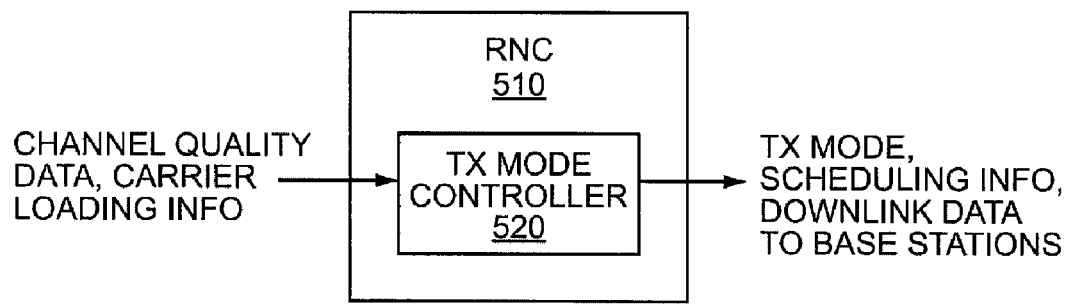
FIG. 5 illustrates a radio network controller modified according to some embodiments of the invention.

The approach pictured in FIGS. 1-4, in which the transmission-mode controller 160 is implemented as part of the serving base station, is consistent with the recent trend in cellular network design to push more control functionality into the network nodes closest to the air interface, thus allowing more rapid response to changing signal conditions, loading conditions, and the like. However, those skilled in the art will appreciate that the functionality of transmission-mode controller 160 may alternatively be implemented at another fixed node in the wireless system, such as a radio network controller. Thus, an RNC 510, modified according to the present invention is pictured in FIG. 5.

RNC 510 includes a transmission-mode controller 520, which receives channel quality data for one or more mobile terminals, forwarded by the serving cell. In some embodiments, transmission-mode controller 520 also receives downlink carrier loading information, which may be factored into the transmission-mode selection in some embodiments, as discussed in more detail below. Based on the channel quality data for a given mobile terminal, which characterizes the channel conditions between the mobile terminal and each base station in the terminal's active set, transmission-mode controller 520 selects an appropriate transmission mode for transmitting downlink packet data to the mobile terminal. As necessary, depending on the selected mode, transmission-mode controller 520 then forwards a transmission-mode identifier, scheduling information (e.g., specifying the applicable intervals for single-frequency-network operation or for interference-coordinated point-to-point operation), and downlink data to the serving base station and one or more neighbor cells in the mobile terminals active set.

Figure 6:
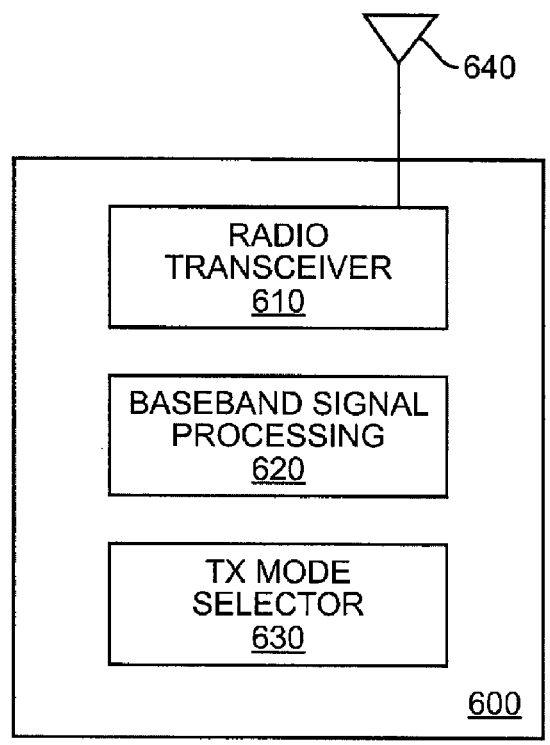
FIG. 6 is a block diagram illustrating functional elements of a mobile terminal according to some embodiments of the invention.

Another alternative approach is illustrated in FIG. 6, which pictures a mobile terminal 600 modified according to the present invention to include a transmission-mode selector 630. With this approach, mobile terminal 600 selects a preferred mode, based on channel conditions between it and various base stations in its active set, and signals that preference to the network. In response, the serving cell or RNC sets up the preferred transmission mode, if network conditions allow.

Thus, exemplary mobile terminal 600 includes antenna 640, conventional radio transceiver 610, and conventional baseband signal processing unit 620. Transmission-mode selector 630 receives channel measurement data from baseband signal processing unit 620, and uses the channel measurement data to select a preferred transmission mode.

The channel measurement data might include, for instance, signal strength information for the serving cell and one or more neighbor cells. If the signal from the serving cell is significantly stronger than the signals received from the neighbors, then an "ordinary" point-to-point mode is likely preferred, without interference coordination. On the other hand, if the signal from the serving cell is relatively weak, and signals from neighbor cells are received at comparable strengths, then a single-frequency-network transmission mode or a round-robin transmission mode may be preferred. As will be discussed in more detail below, transmission-mode selector 630 (as well as the transmission-mode controllers 160 and 520 described above) may in some embodiments estimate an expected signal-to-interference ratio for each of the available modes, based on the channel quality data, and select the preferred transmission mode based on those estimated SIRs. In some cases, the transmission-mode selector 630 or transmission-mode controllers 160 or 520 may also estimate an achievable data rate, based on the estimated SIRs or measured channel conditions, and select the transmission mode based on the estimated achievable data rate. Other factors, such as carrier loading, quality-of-service requirements associated with the downlink data, channel conditions and/or data throughput requirements for other users, and the like, may also be used in the selection process.

Figure 7:
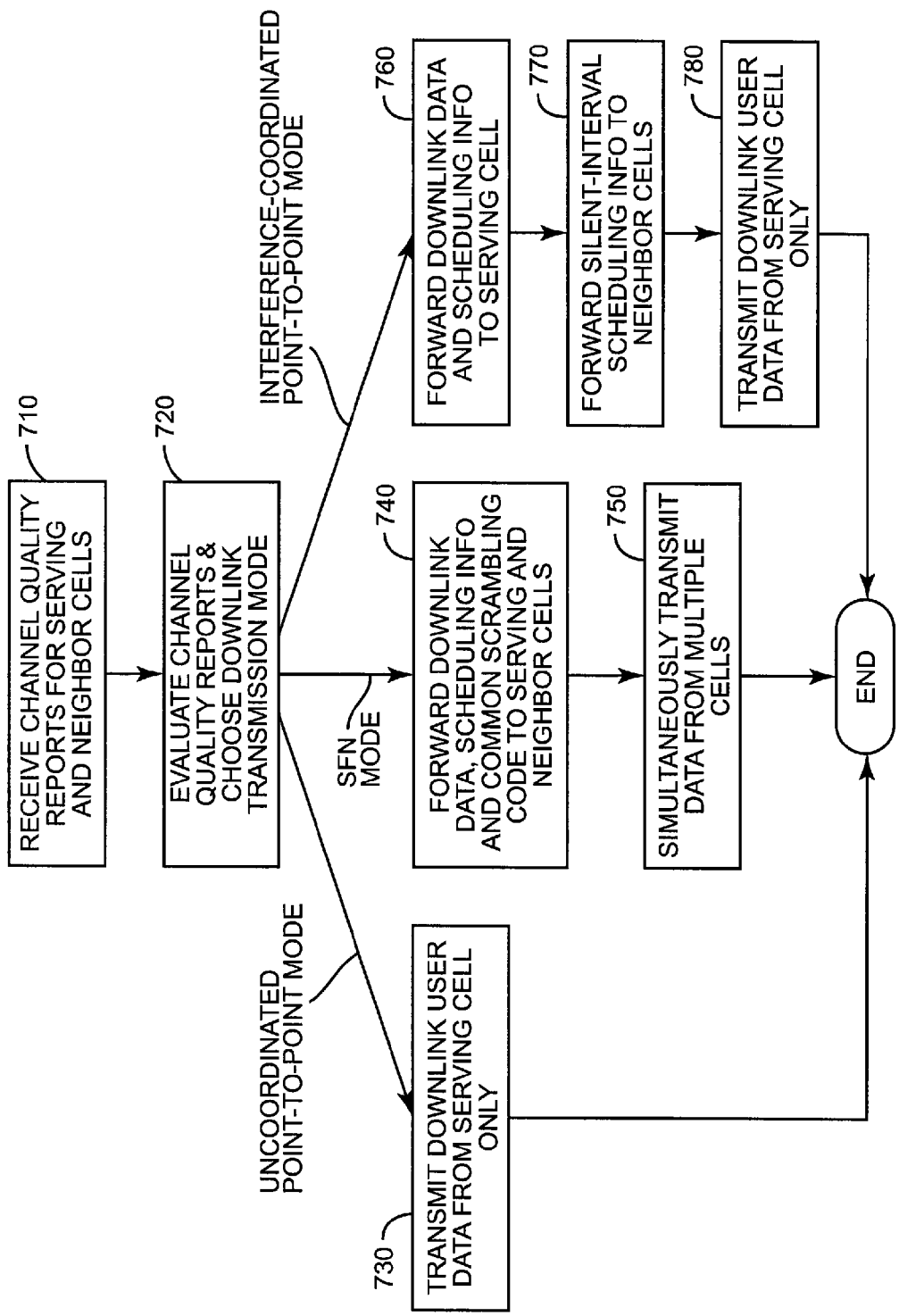
FIG. 7 is a process flow diagram illustrating an exemplary method of adaptively transmitting data in a wireless communication network.

With the network and device configurations discussed above in mind, FIG. 7 provides a process flow diagram illustrating an exemplary general method for adaptively transmitting data in a wireless communication network. Those skilled in the art will appreciate that the method pictured in FIG. 7, and variants thereof, are generally applicable to embodiments of the invention in which the transmission-mode selection is performed by a fixed network node, such as the serving cell base station or a radio network controller.

As was discussed earlier, a target mobile station is generally connected to a serving cell and monitors neighboring cells. In the event that there are any neighbor cells that are almost as strong as the serving cell, the mobile terminal adds these cells to the active set, i.e., is in soft handover with these cells. It listens and decodes power control commands from each of the cell in the active set and controls its transmitter output power accordingly. Those skilled in the art will appreciate that these operations are according to conventional W-CDMA/HSPA techniques. In embodiments of the present invention, however, the terminal also measures the channel conditions for each of the cells in the active set, using any of a variety of known techniques. A channel quality indicator (CQI) or other channel quality report is transmitted on a regular basis to the network, via the serving cell. The process flow diagram of FIG. 7 thus picks up at this point, as shown at block 710, with the reception of channel quality reports for the serving cell and one or more neighbor cells in the active set.

As shown at block 720, a transmission-mode controller evaluates the CQI reports and chooses a downlink transmission mode for supporting the target mobile terminal. As discussed above with respect to FIGS. 2-4, the set of available transmission modes may include two or more alternatives, such as: an "ordinary" transmission mode, which as discussed above may be considered a non-interference-coordinated point-to-point-mode; a "unicast," or multi-cell single-frequency-network transmission mode; and a "round-robin," or interference-coordinated point-to-point transmission mode.

In the event that the transmission-mode controller selects the point-to-point mode without interference coordination, i.e., the "ordinary" mode, then downlink user data is transmitted according to the conventional approach, as shown at block 730. In other words, in the ordinary transmission mode the serving cell transmits data to the mobile terminal independently of the downlink transmissions by neighboring cells to other mobile terminals. The downlink transmission at block 730 continues for as long as the data session is ongoing, or until a transmission mode reconfiguration is triggered (not shown), which may result, for example, from the expiry of a timer or from a significant change in signal conditions or network loading conditions.

If the transmission-mode controller instead selects the single-frequency-network transmission mode, the RNC (or RNCs) controlling the cells in the active set is informed. Then, once the RNC receives data destined to the mobile terminal, the RNC feeds the downlink user data forward not only to the serving cell, but also to the other cells in the active set, as shown at block 740. The RNC also provides scheduling information, informing the cells of which time transmission intervals should be used for transmitting the downlink data. The data is then simultaneously transmitted, as shown at block 750, using the same scrambling code for all cells in the active set. The information about which scrambling code to use may be provided in advance (e.g., at connection setup), in which case one or more bits in the control signaling (e.g., via the High-Speed Shared Control Channel, or HS-SCCH) may be used to inform the mobile terminal of which scrambling code, from a pre-determined set, to use. Another alternative is that the scrambling code is indicated as a message within the HS-SCCH transmitted along with the downlink user data transmission. Once the unicast single-frequency-network packets sent simultaneously from all cells in the active set are received, the mobile terminal coherently combines the symbols and decodes the packets. Thereby a coherence (power) gain is achieved.

In some embodiments, retransmissions of unsuccessfully decoded data packets are transmitted by only the serving cell, during time instances other than those scheduled for the simultaneous unicast transmission. In these embodiments, the other cells in the active set only transmit the initial transmission of the downlink user data. With this approach, the communication over the Iu/Iub interface between RNC and the cells is simplified. In any event, the downlink transmission at block 750 continues for as long as the data session is ongoing, or until a transmission mode reconfiguration is triggered (not shown), which may result, for example, from the expiry of a timer, the completion of all scheduled intervals, or from a significant change in signal conditions or network loading conditions.

In the event that the transmission-mode controller chooses the interference-coordinated point-to-point transmission mode, the RNC (or RNCs) controlling the cells in the active set is informed. Then, once the RNC receives data destined for the mobile terminal, the RNC feeds the downlink user data forward to the serving cell, as shown at block 760. The RNC also informs the serving cell of which time intervals to use for transmitting the downlink user data. The RNC also instructs the other cells in the active set to not schedule any downlink packets to any mobile terminals during the scheduled intervals. This may take the form of "silent-interval" scheduling information, as shown at block 770. Thus, during each of the scheduled intervals for the interference-coordinated point-to-point transmission, the serving cell is the only cell in the mobile terminal's active set that is transmitting the downlink traffic channel (HS-PDSCH) to any mobile terminal, as shown at block 780.

In the event that retransmissions of erroneous packets are needed, these may be transmitted from the serving cell during one or more of the scheduled time intervals, since no additional inter-cell coordination is needed. As with the other transmission modes, the interference-coordinated point-to-point transmission mode may continue for as long as the data session is ongoing or until a transmission mode reconfiguration is triggered.

Whether performed in the serving cell, an RNC, or in the mobile terminal, the selection of which transmission mode to use at any given time is generally performed so that better cell edge throughput and/or system capacity is achieved. In the approach described in general terms above, the selection of the preferred transmission mode is based on channel quality measurements taken by the mobile station. In some embodiments, as described more fully below in connection with FIG. 8, a serving cell or RNC selects the transmission mode based on estimated SIRs for each of the transmission modes and/or an expected achievable data rate for each mode, where the estimated SIRs and/or achievable data rates are derived at least indirectly from channel quality reports received from the mobile terminal. In other embodiments, a "trial-and-error" approach may be used instead, where evaluation of the channel conditions between the mobile terminal and the base stations in the active set is performed indirectly, by successively testing two or more of the available downlink transmission modes to determine corresponding achievable data throughputs. In these embodiments, selecting the preferred transmission mode may comprise simply selecting the tested downlink transmission mode yielding the highest achievable data throughput.

Figure 8:
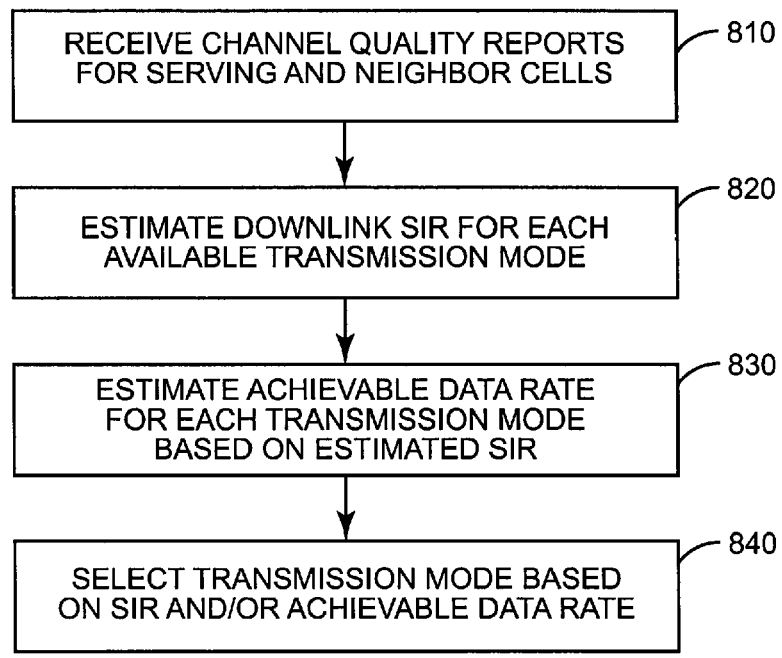
FIG. 8 is another process flow diagram illustrating details of an exemplary method for selecting a transmission mode.

In the exemplary method pictured in FIG. 8, a transmission-mode controller receives mobile terminal measurement data or CQI information from the mobile terminal characterizing the channel conditions between the mobile terminal and each of the cells in the terminal's active set. In some embodiments, this information may simply indicate the received power levels from each of the cells in the active set. In various embodiments, the transmission-mode controller may also have available information characterizing the mobile terminal's receiver capabilities, current network loading data, and/or any other relevant network configuration information.

For the sake of concreteness, consider a setup with N cells in the active set of a target mobile terminal. Further assume that the reported channel condition data includes the total own-cell received power ($I_1$) as well as the set of interference powers observed for the neighbor cells ($I_k$, k=2, ..., N) by the mobile terminal during "normal" HSDPA operation. Next, assume that the non-HSDPA load for each cell in the active set ($a_k$, k=1, ..., N) is known to the transmission-mode controller. Finally, assume that the target mobile terminal is the only HSDPA user in its cell.

After receiving the channel quality reports for the serving and neighbor cells in the active set, as shown at block 810 of FIG. 8, the transmission-mode controller estimates the post-detection signal-to-interference ratio (SIR) corresponding to each of the available transmission modes, as shown at block 820. For the given example, the achievable SIR values may be computed as follows:

$$SIR_A = \frac{(1-a_1)I_1}{\sum_{k=2}^{N} I_k}, \quad (1)$$

$$SIR_B = \frac{\left(\sum_{k=1}^{N} \sqrt{(1-a_k)I_k}\right)^2}{\sum_{k=1}^{N}\left(a_k I_k + \sum_{l \neq k} I_l\right)}, \text{ and} \quad (2)$$

$$SIR_C = \frac{(1-a_1)I_1}{\sum_{k=2}^{N} a_k I_k}, \quad (3)$$

where $SIR_A$, $SIR_B$, and $SIR_C$ are the estimated post-detection SIRs for the ordinary point-to-point HSDPA transmission mode, the multi-cell single-frequency-network transmission mode, and the interference-coordinated point-to-point transmission mode, respectively.

If a different measurement set is used, the calculation of the SIR for each transmission mode becomes different, but those skilled in the art will appreciate that for all practically interesting measurement scenarios, the quantities measured under a specific transmission mode may be converted to a form that allows evaluating the SIR values that would be reached under other transmission modes. In the current example, it is assumed that the reported $I_k$ values already reflect the interference suppression capability of the UE receiver. Alternatively, however, the $I_k$ values may be reported prior to suppression. In such embodiments, additional information may be provided to the transmission-mode controller indicating the interference-suppression capabilities of the target mobile terminal, such as an indication that the mobile terminal has an advanced G-Rake receiver that can remove a designated fraction of the strongest neighbor cell interference.

In some embodiments, an achievable data rate for each transmission mode may be estimated, based on the estimated SIRs, as shown at block 830. For example, achievable data rates corresponding to the derived SIR values may be retrieved from a pre-computed lookup table indexed by the transmission mode and the SIR values. The transmission mode with the highest SIR or available rate is then selected, as shown at block 840, and signaled to the mobile terminal and other participating nodes in the fixed side of the wireless network.

Figure 9:
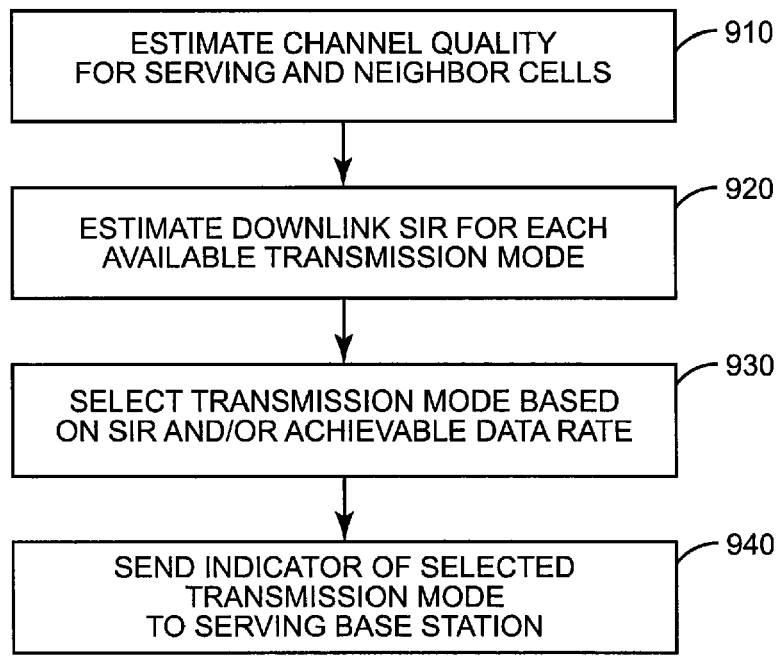
FIG. 9 is a process flow diagram illustrating an exemplary method according to the invention for selecting a downlink transmission mode at a mobile terminal.

As was noted above, in some embodiments of the invention a transmission-mode selector in the mobile terminal may be configured to select a preferred transmission mode. This was illustrated with the mobile terminal 600 illustrated in FIG. 6, which includes a transmission-mode selector 630. FIG. 9 illustrates an exemplary method for selecting a transmission mode that might be implemented with such a mobile terminal.

The mobile terminal begins by estimating channel quality for the serving cell and neighbor cells in the active set, as shown at block 910. As before, this channel quality estimation process may be as simple as measuring received signal power, in some embodiments. In any case, the transmission-mode selector uses the estimated channel quality corresponding to each of the cells in the active set to estimate a downlink SIR for each of the available transmission modes, as shown at block 920. In some embodiments, carrier loading information may be available to the mobile terminal's transmission-mode selector, in which case the calculation of the SIR may use the equations discussed above. In other embodiments, however, accurate carrier loading information may not be available to the mobile terminal. In this case, simplified versions of Equations (1)-(3) might be used instead. For instance, the equations discussed above, or equivalents thereof, may be modified to include nominal carrier loading factors, rather than reported loading factors based on current conditions.

In any event, after estimating the SIR corresponding to each of the available transmission modes, the mobile terminal's transmission-mode selector selects the transmission mode that best suits its needs, as shown at 930, and sends an indicator of the preferred transmission mode to the serving base station, as shown at 940. As discussed earlier with respect to network-side implementations of the transmission-mode selection, the selection may be based directly on the SIRs, or based on an estimated achievable data rate for each of the transmission modes.

Those skilled in the art will appreciate that in embodiments where the preferred transmission mode is selected by the mobile terminal, detailed CQI information for each of the members of the active set does not have to be sent to the serving cell. While the preferred mode signaled by the mobile terminal may not be optimal with respect to maximizing network capacity, because of the limited information available to the mobile terminal, it might provide a mechanism for allowing a privileged, or "VIP," mobile terminal to achieve maximum downlink data throughput under a variety of conditions. Of course, the network may be configured to ignore or over-ride the preferred transmission mode signaled by the mobile terminal, depending on network conditions such as loading.

Figure 10:
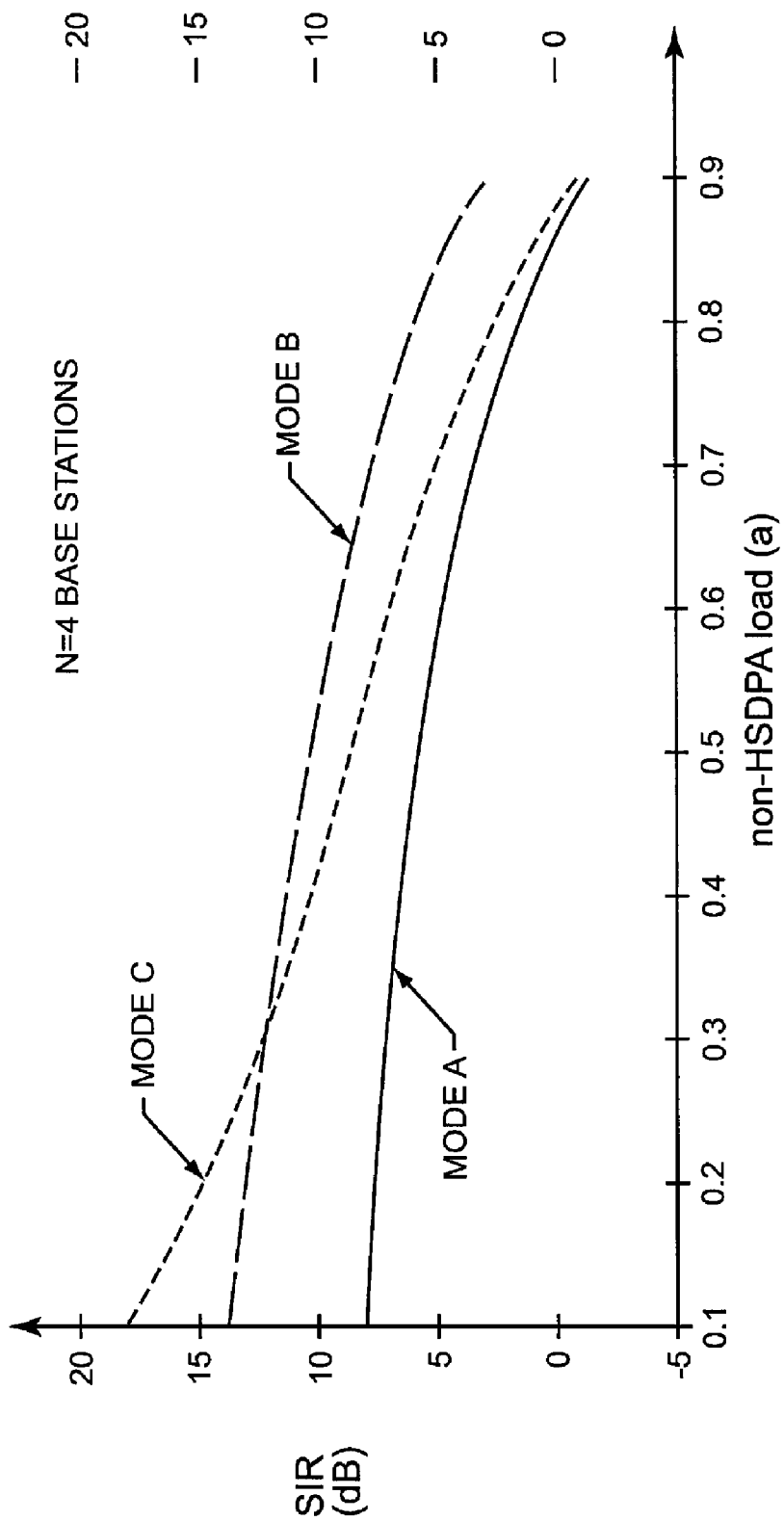
FIG. 10 plots the estimated SIR for each of several transmission modes versus non-HSDPA carrier loading, for an exemplary network configuration.

One example of an optimal selection task is described below. Consider a situation where the mobile terminal is situated at the edge of the serving cell, with a total of N=4 base stations in the active set, at approximately equal distances from the mobile terminal. Assume further that there is a single-path propagation channel to each base station, and that the mobile terminal has two antennas and a G-Rake receiver, allowing the receiver to suppress 90% of the interference from one neighbor cell. (Those skilled in the art will appreciate that this scenario is simplified for numerical illustration; this approach may be extended to account for dispersive channels, a different number of cells in the active set, or unequal mobile-to-base station.) The plot in FIG. 10 shows the resulting post-demodulation symbol SIR values for the different transmission modes, where the carrier loading, i.e., the fraction of the power allocated to channels other than HS-PDSCH, plotted on the x-axis, is assumed to be identical for all 4 base stations. For any given value of carrier loading, the plot of FIG. 10 thus indicates which of the three transmission modes yields the highest SIR.

In the example scenario pictured in the plot, "Mode A," which is the conventional point-to-point transmission mode, without interference coordination, always provides the lowest SIR. This result follows directly from the assumption that the power levels received from each of the three neighbor cells are equal to the power level from the serving cell. However, the tradeoff between Mode B, the single-frequency-network transmission mode, and Mode C, the round-robin mode, is not as obvious for this assumed scenario. At very low loading levels the round-robin transmission mode provides the highest SIR, and the highest corresponding achievable throughput, while the multi-cell single-frequency-network approach provides higher SIRs at higher non-HSDPA loading levels.

Of course, the criterion of optimizing the SIR for one given user may or may not always be appropriate, depending on the network usage state. For example, applying either the multi-cell single-frequency-network mode or the round-robin mode implies an average effective duty cycle of 1/N, if there are users to be served at full utilization in all the cells of the active set. In such cases, where there is high demand for HSDPA service, the conventional point-to-point transmission mode may be preferred, despite its lower resulting per-mobile SIR value. On the other hand, in the case of lower utilization of the HSDPA service, minimal impact to system capacity may result from the use of one of the alternate transmission modes. Since a scheduling entity in the network (e.g., a transmission-mode controller 160 in the serving cell, or 520, in the RNC) may have access to the loading and HSDPA utilization information, these and other similar aspects may be accounted for in choosing among the transmission modes. Thus, for instance, the transmission-mode controller may evaluate the available rates for a number of users in different cells for different transmission modes and choose the transmission mode that maximizes the total throughput. The skilled practitioner will appreciate the broad range of network utilization parameters and configurations that a scheduler may consider in various embodiments of the present invention.

Using the inventive techniques described herein, a higher cell-edge throughput in HSDPA systems may be achieved. This in turn enhances the user experience significantly, by eliminating or mitigating "grey spots" on a network operator's high-speed wireless data coverage map. By dynamically choosing the appropriate transmission mode, network resources may be used more efficiently at all times, providing the user with the best possible service for a given geographical location under a variety of network load and channel conditions.

Although described herein with respect to HSDPA systems, as specified by the 3GPP, those skilled in the art will appreciate that the techniques and systems described herein may be implemented in wireless systems of other types. Broadly speaking, the various methods of channel quality estimation described and signal processing described herein, and variations thereof, may be implemented using wireless receivers configured for processing various types of signals, including, but not limited to, communication signals formatted according to standards for Wideband Code-Division Multiple Access (W-CDMA), or cdma2000. Compatible receivers according to embodiments of the present invention may employ G-RAKE processing, chip equalization, digital processing techniques, successive interference cancellation techniques, interference projection techniques, or the like.

Those skilled in the art will appreciate that several of the various functional elements described herein, such as transmission-mode controllers 160 and 520, or transmission-mode selector 630, may comprise hardware, software, or any combination thereof. In some embodiments, these elements may comprise at least one special- or general-purpose microprocessor circuit (to include DSP-type processors), configured with appropriate software and/or firmware to carry out one or more of the methods and techniques described herein. In such embodiments, the above-described functions of the transmission-mode controller 160 or 520, or transmission-mode selector 630, may be obtained by, for example, provisioning a memory/storage device of the serving cell base station, radio network controller, or mobile terminal, as appropriate, with a computer program comprising program instructions corresponding to the one or more of the described processing flows or variants thereof. Those skilled in the art will further appreciate that the various functions of the transmission-mode controllers and transmission-mode selectors described herein may be split between two or more processing units, in some embodiments. Indeed, in some embodiments these functions may even be split between two or more distinct nodes of a wireless communications network, such as between a base station and a radio network controller.

Broadly, the teachings of the present disclosure thus provide techniques and corresponding devices for adaptively transmitting data in a wireless communication network. In various embodiments, channel conditions between a mobile terminal and two or more base stations in an active set are evaluated, and used to select a transmission from a set of available downlink transmission modes. This set includes a non-interference-coordinated point-to-point transmission mode as well as at least one of a multi-cell single-frequency-network transmission mode and an interference-coordinated point-to-point transmission mode. With the variations of the methods and apparatus described herein in mind, those skilled in the art will appreciate that the present invention is not limited by the foregoing discussion, nor is it limited by the accompanying drawings. Rather, the present invention is limited only by the following claims, and their legal equivalents.

What is claimed is:

1. A method of adaptively transmitting data in a wireless communication network, the method comprising:
    evaluating channel conditions between a mobile terminal and each of two or more base stations in an active set by determining, based on the channel conditions, a metric for each transmission mode in a set of available downlink transmission modes, the set including a non-interference-coordinated point-to-point transmission mode and at least one of a multi-cell single-frequency-network transmission mode and an interference-coordinated point-to-point transmission mode; and
    selecting a transmission mode from the set based on the determined metrics.

2. The method of claim 1, wherein said evaluating and said selecting are performed at the mobile terminal, further comprising transmitting an indicator of the selected transmission mode to the base station serving the mobile terminal.

3. The method of claim 1, wherein said evaluating and said selecting are performed at a control node in the wireless communication network, further comprising transmitting downlink user data according to the selected transmission mode.

4. The method of claim 3, further comprising receiving, from the mobile terminal, channel quality reports corresponding to each of the two or more base stations, wherein said evaluating channel conditions comprises evaluating the received channel quality reports.

5. The method of claim 4, wherein determining a metric value for each of the available downlink transmission modes comprises estimating a downlink data rate for each of the available downlink transmission modes, based on the received channel quality reports, and wherein selecting a transmission mode comprises selecting the available transmission mode having the highest estimated downlink data rate.

6. The method of claim 4, wherein determining a metric value for each of the available downlink transmission modes comprises estimating a downlink signal-to-interference ratio for each of the available downlink transmission modes, based on the received channel quality reports, and wherein selecting a transmission mode comprises selecting the available transmission mode having the highest estimated downlink signal-to-interference ratio.

7. The method of claim 6, wherein estimating a downlink signal-to-interference ratio for each of the available downlink transmission modes is further based on downlink carrier loading information for each of the base stations.

8. The method of claim 1, wherein said determining a metric value for each of the available downlink transmission modes comprises successively testing two or more of the available downlink transmission modes to determine corresponding achievable data throughputs to the mobile terminal for each available downlink transmission mode and wherein selecting the transmission mode based on the determined metrics comprises selecting the tested downlink transmission mode with the highest achievable data throughput.

9. The method of claim 1, wherein said selecting a transmission mode is further based on at least one of a downlink data throughput requirement for the mobile terminal and current downlink loading information for one or more of the two or more base stations.

10. The method of claim 1, further comprising evaluating other-user channel conditions, an other-user achievable data rate, or both, for at least one additional mobile terminal served by one or more base stations in the active set, and selecting the transmission mode based further on the other-user channel, other-user achievable data rate, or both.

11. The method of claim 1, further comprising, responsive to selection of the multi-cell single-frequency-network transmission mode:
    sending single-frequency-network scheduling data to the base stations in the active set; and
    forwarding downlink user data to the base stations for simultaneous transmission to the mobile terminal.

12. The method of claim 11, further comprising indicating a common scrambling code to each of the base stations in the active set for use in the simultaneous transmission of the downlink user data to the mobile terminal.

13. The method of claim 1, further comprising, responsive to selection of the interference-coordinated point-to-point transmission mode:
    forwarding downlink user data and transmission scheduling information to the base station serving the mobile terminal; and
    sending silence scheduling information to other base stations in the active set, the silence scheduling information indicating intervals during which no downlink user data should be scheduled by the other base stations.

14. A transmission-mode controller in a wireless communication network, the transmission-mode controller comprising one or more processing circuits configured to:
    evaluate channel conditions between a mobile terminal and each of two or more base stations in an active set by determining, based on the channel conditions, a metric for each transmission mode in a set of available downlink transmission modes, the set including a non-interference-coordinated point-to-point transmission mode and at least one of a multi-cell single-frequency-network transmission mode and an interference-coordinated point-to-point transmission mode; and
    select a transmission mode from the set based on the determined metrics.

15. The transmission-mode controller of claim 14, wherein the one or more processing circuits are further configured to schedule one or more of the base stations for transmitting downlink user data according to the selected transmission mode.

16. The transmission-mode controller of claim 14, wherein the one or more processing circuits are further configured to receive, from the mobile terminal, channel quality reports corresponding to each of the two or more base stations and to evaluate the channel conditions by evaluating the received channel quality reports.

17. The transmission-mode controller of claim 16, wherein the one or more processing circuits are configured to determine a metric for each available transmission mode by estimating a downlink data rate for each of the available downlink transmission modes, based on the received channel quality reports, and to select a transmission mode by selecting the available transmission mode having the highest estimated downlink data rate.

18. The transmission-mode controller of claim 16, wherein the one or more processing circuits are configured to determine a metric value for each available transmission mode by estimating a downlink signal-to-interference ratio for each of the available downlink transmission modes, based on the received channel quality reports, and to select a transmission mode by selecting the available transmission mode having the highest estimated downlink signal-to-interference ratio.

19. The transmission-mode controller of claim 18, wherein the one or more processing circuits are configured to estimate the downlink signal-to-interference ratio for each of the available downlink transmission modes based further on downlink carrier loading information for each of the base stations.

20. The transmission-mode controller of claim 14, wherein the one or more processing circuits-are configured to:
    determine a metric for each transmission mode by successively testing two or more of the available downlink transmission modes to determine corresponding achievable data throughputs to the mobile terminal for each available transmission mode; and
    select the transmission mode by selecting the tested downlink transmission mode with the highest achievable data throughput.

21. The transmission-mode controller of claim 14, wherein the one or more processing circuits are configured to select the transmission mode based further on at least one of a downlink data throughput requirement for the mobile terminal and current downlink loading information for one or more of the two or more base stations.

22. The transmission-mode controller of claim 14, wherein the one or more processing circuits are further configured to evaluate other-user channel conditions, an other-user achievable data rate, or both, for at least one additional mobile terminal served by one or more base stations in the active set, and to select the transmission mode based further on the other-user channel, other-user achievable data rate, or both.

23. The transmission-mode controller of claim 14, wherein the one or more processing circuits are further configured to, responsive to selection of the multi-cell single-frequency-network transmission mode:
    send single-frequency-network scheduling data to the base stations in the active set; and
    forward downlink user data to the base stations for simultaneous transmission to the mobile terminal.

24. The transmission-mode controller of claim 23, wherein the one or more processing circuits are further configured to indicate a common scrambling code to each of the base stations in the active set for use in the simultaneous transmission of the downlink user data to the mobile terminal.

25. The transmission-mode controller of claim 14, wherein the one or more processing circuits are further configured to, responsive to selection of the interference-coordinated point-to-point transmission mode:
    forwarding downlink user data and transmission scheduling information to the base station serving the mobile terminal; and
    sending silence scheduling information to other base stations in the active set, the silence scheduling information indicating intervals during which no downlink user data should be scheduled by the other base stations.

26. A mobile terminal for use in a wireless communication network, the mobile terminal comprising a processor functioning as a transmission-mode selector that is configured to:
    evaluate channel conditions between the mobile terminal and two or more base stations in an active by determining, based on the channel conditions, a metric for each transmission mode in a set of available downlink transmission modes, the set including a non-interference-coordinated point-to-point transmission mode and at least one of a multi-cell single-frequency-network transmission mode and an interference-coordinated point-to-point transmission mode;
select a transmission mode from the set based on the determined metric values; and
send an indicator of the selected transmission mode to the base station serving the mobile terminal.

* * * * *

UNITED STATES PATENT AND TRADEMARK OFFICE
CERTIFICATE OF CORRECTION

| | |
|---|---|
| PATENT NO. | : 8,208,936 B2 |
| APPLICATION NO. | : 12/204040 |
| DATED | : June 26, 2012 |
| INVENTOR(S) | : Lindoff et al. |

It is certified that error appears in the above-identified patent and that said Letters Patent is hereby corrected as shown below:

In Column 16, Line 31, in Claim 26, delete "active" and insert -- active set --, therefor.

Signed and Sealed this
Twentieth Day of November, 2012

David J. Kappos
*Director of the United States Patent and Trademark Office*